(12) United States Patent
Kogetsu et al.

(10) Patent No.: US 7,862,930 B2
(45) Date of Patent: Jan. 4, 2011

(54) NEGATIVE ELECTRODE FOR LITHIUM ION SECONDARY BATTERY, PRODUCING METHOD THEREFOR, AND LITHIUM ION SECONDARY BATTERY USING THE NEGATIVE ELECTRODE

(75) Inventors: Yasutaka Kogetsu, Suita (JP); Toshitada Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 1053 days.

(21) Appl. No.: 11/377,276

(22) Filed: Mar. 17, 2006

(65) Prior Publication Data

US 2006/0210875 A1  Sep. 21, 2006

(30) Foreign Application Priority Data

Mar. 17, 2005 (JP) ............................. 2005-076816

(51) Int. Cl.
*H01M 4/58* (2010.01)
*H01M 4/02* (2010.01)

(52) U.S. Cl. ................. 429/218.1; 429/231.5; 429/429; 429/209

(58) Field of Classification Search ............... 429/218.1, 429/220

See application file for complete search history.

(56) References Cited

U.S. PATENT DOCUMENTS

2005/0118504 A1 * 6/2005 Honda et al. ............. 429/218.1

FOREIGN PATENT DOCUMENTS

| CA | 02423608 | * | 3/2003 |
|----|----------|---|--------|
| JP | 8-50922 A | | 2/1996 |
| JP | 2002-231224 | | 8/2002 |
| JP | 2002-289177 | * | 10/2002 |
| JP | 2003-17039 | | 1/2003 |
| KR | 2002-231224 | | 8/2002 |
| KR | 2002-289177 | | 10/2002 |
| WO | WO 01/31721 A1 | | 5/2001 |

OTHER PUBLICATIONS

Korean Office action issued in Korean Patent Application No. 10-2006-0024252 dated on Mar. 28, 2008.
Korean Office Action issued in Korean Patent Application No. KR 10-2006-0024252, mailed Mar. 29, 2007.
Korean Office Action, issued in corresponding Korean Patent Application No. 10-2006-0024252, mailed on Oct. 1, 2007.

* cited by examiner

*Primary Examiner*—Ula C Ruddock
*Assistant Examiner*—Jacob Marks
(74) *Attorney, Agent, or Firm*—McDermott Will & Emery LLP

(57) ABSTRACT

A negative electrode for a lithium ion battery with high capacity, excellent cycle performance, and discharge performance at high load. In the negative electrode for a lithium ion secondary battery including a current collector and an active material layer carried on the current collector: the active material layer includes silicon, and an element M incapable of forming an alloy with lithium; the proportion of element M is higher in a first side contacting the current collector than in a second side opposite to the first side, in the thickness direction of the active material layer; the element M is different from the element forming the current collector; and the active material layer does not include a binder.

5 Claims, 6 Drawing Sheets

F I G. 5
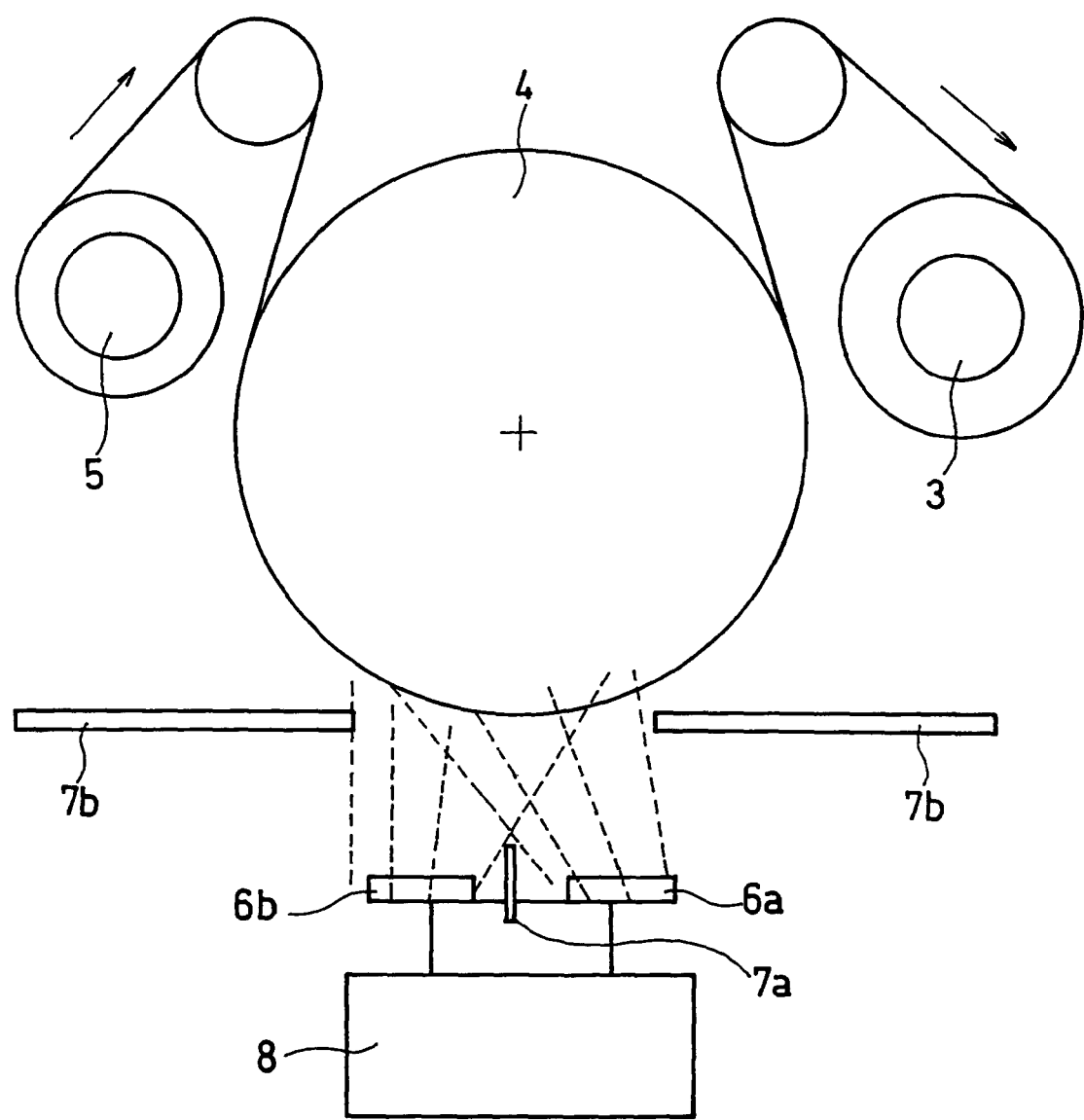

F I G. 7
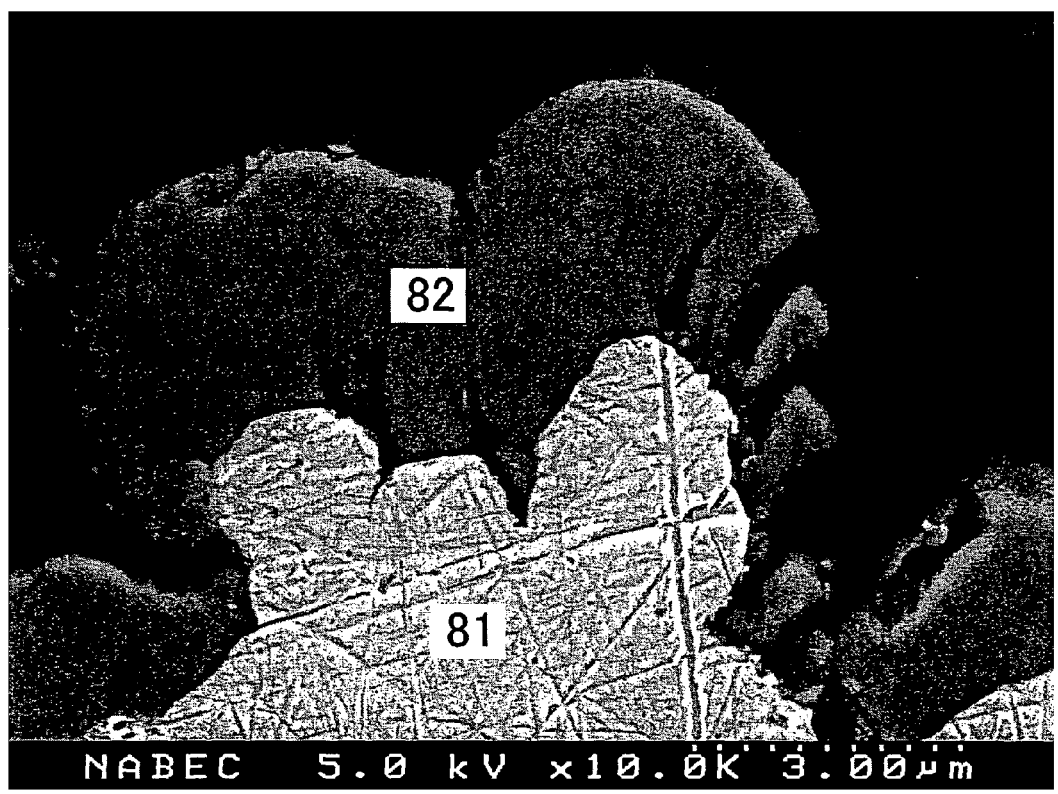

NEGATIVE ELECTRODE FOR LITHIUM ION SECONDARY BATTERY, PRODUCING METHOD THEREFOR, AND LITHIUM ION SECONDARY BATTERY USING THE NEGATIVE ELECTRODE

BACKGROUND OF THE INVENTION

The present invention relates to lithium ion secondary batteries, especially to a negative electrode for a lithium ion secondary battery and to a producing method thereof.

Lithium ion secondary batteries are gaining attention as a power source for driving electronic devices. As a negative electrode material for the lithium ion secondary battery, graphite is used mainly. However, graphite is low in capacity per unit mass, i.e., 372 mAh/g, and capacity improvement of the lithium ion secondary battery is quite difficult.

On the other hand, as a negative electrode material with higher capacity than graphite, a material that forms an intermetallic compound with lithium, such as silicon, tin, and oxides thereof, are prospective materials, for example. However, the crystal structure of these materials change while absorbing lithium to cause volume expansion. For example, when the simple substance of silicon absorbs lithium to the maximum, its volume becomes $Li_{4.4}Si$. At this time, the volume expansion ratio by the charging was 4.12 times the original volume. On the other hand, the volume expansion rate in the case of graphite is 1.2 times the original volume.

The great change in volume as noted in the above causes cracks of active material particles and contact failure between the active material and the current collector, generating a possibility for shortening the charge and discharge cycle life. Particularly, when active material particles crack, the specific surface area of the active material increases, thereby promoting the reactions between the active material and non-aqueous electrolyte. As a result, the interface resistance increases due to a formation of a coating on the surface of the active material, for example, creating a cause for shortening charge and discharge cycle life.

For such problems, to secure space for easing the expansion stress and to secure current collecting performance, International Publication No. 01/031721 for example examines providing a thin film formed of an active material absorbing and desorbing lithium on the current collector, and diffusing the current collector component in the thin film, in an electrode for a lithium battery.

Japanese Laid-Open Patent Publication No. Hei 8-50922 proposes a method using an alloy formed of a metal element which forms an alloy with lithium and a metal element which does not form an alloy with lithium for the negative electrode material to minimize the cracks of the negative electrode material from the expansion and contraction stress during charge and discharge.

BRIEF SUMMARY OF THE INVENTION

However, upon carrying out the method of International Publication No. 01/031721, the following problems were revealed by the inventors of the present invention. When the element of the current collector is diffused in the silicon thin film, the thickness of the current collector portion (current collecting portion) comprising only the current collector element becomes small. Additionally, silicon diffuses from the silicon thin film to the current collector as well. Such diffusion of silicon to the current collector reduces the strength of the current collector, making the current collector weak and susceptible to fracture. Further, by such diffusion of silicon in the current collector, conductivity of the current collector decreases. From the above results, in the method of International Publication No. 01/031721, the decrease in the strength of the current collector makes the electrode apt to fracture, and tends to cause nonconforming products at the time of assembly. Moreover, the decrease in conductivity of the current collector increases the electrode resistance, thereby deteriorating discharge performance at high load.

Claim 2 of Japanese Laid-Open Patent Publication No. Hei 8-50922 recites to increase the content of the element which does not form an alloy with lithium at the negative electrode surface. However, since the content of the element which forms an alloy with lithium is high at the side contacting with the current collector, the degree of the expansion and contraction by charging and discharging is intense, causing the deformation of the electrode plate and the fracture of the current collector.

To solve the above problems, a negative electrode for the lithium ion secondary battery of the present invention is characterized in that:

a current collector and an active material layer carried on the current collector are included;

the active material layer comprises a deposit including silicon and an element M which does not form an alloy with lithium (an element M incapable of forming an alloy with lithium);

a proportion of the element M in the thickness direction of the active material layer is larger in a first side contacting the current collector than in a second side opposite to the first side (in other words, the proportion of the element M becomes higher from the second side to the first side); and the element M is different from an element forming the current collector.

By using such a negative electrode of the present invention, a lithium ion secondary battery with high capacity, and excellent cycle performance and discharge performance at high load is achieved.

A method of producing a negative electrode for a lithium ion secondary battery of the present invention is characterized by including:

depositing at least one of a silicon atom and an atom of an element M on a current collector with a sputtering method or a vapor deposition method in which a first target including the element M incapable of forming an alloy with lithium and a second target of a simple substance of silicon are used, while moving the current collector continuously to form an active material layer including silicon and the element M on the current collector:

wherein the ratio of the element M relative to lithium in the group of atoms moving toward the current collector from the first target and the second target, is decreased along the direction of the movement of the current collector.

Such a manufacturing method produces a negative electrode which achieves a lithium ion secondary battery with high capacity, and excellent cycle performance and discharge performance at high load.

Additionally, a lithium ion secondary battery of the present invention includes a positive electrode, the negative electrode of the present invention, a separator disposed between the positive electrode and the negative electrode, and an electrolyte.

The lithium ion secondary battery of the present invention is high in capacity, and excellent in cycle performance and discharge performance at high load, since the above mentioned negative electrode of the present invention is included.

The active material layer in the negative electrode for a lithium ion secondary battery of the present invention comprises a deposit including silicon, and an element M incapable of forming an alloy with lithium. The "deposit" includes, for example, a film and a sheet obtained by vapor deposition and sputtering. Therefore, the active material layer in the present invention does not include a binder.

The "element M incapable of forming an alloy with lithium" refers to an element which does not react with lithium electrochemically, i.e., an element inert to lithium. The element M preferably is an element of at least one selected from the group consisting of titanium, nickel, copper, cobalt, and iron, for example.

The "proportion of the element M" in the active material layer of the negative electrode for the lithium ion secondary battery of the present invention refers to the mole ratio of the element M relative to silicon (for example, the mole ratio x of the element M in the formula: $SiM_x$).

In the negative electrode for the lithium ion secondary battery of the present invention, the active material layer may take various forms, including a sheet form, for example. The active material layer surface may be flat, or may be uneven.

An example of the active material layer with uneven surface is shown in FIG. 7. FIG. 7 is an image of electron microscope of the active material layer with uneven surface of the present invention. As shown in FIG. 7, when a current collector 81 has uneven surface, adhesion strength between an active material layer 82 and the current collector 81 improves, to achieve the effect of reducing the separation of the active material layer 82 from the current collector 81.

The active material layer in the negative electrode for the lithium ion secondary battery of the present invention may be formed of a plurality of columnar negative electrode active material particles. The columnar active material particles may be formed to project in the direction perpendicular to the average plane of the current collector, or may be formed to project at a predetermined angle from the average plane. The columnar active material particles may contact with each other. The average plane of the current collector refers to the plane of the current collector with the uneven surface flattened.

According to the present invention, a negative electrode which enables a lithium ion secondary battery with high capacity, and excellent cycle performance and discharge performance at high load can be obtained easily and reliably.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 5 is a diagram of a sputtering apparatus used in Example of the present invention.

FIG. 7 is an image of electron microscope of the active material layer with uneven surface of the present invention.

DETAILED DESCRIPTION OF THE INVENTION

Figure 1:
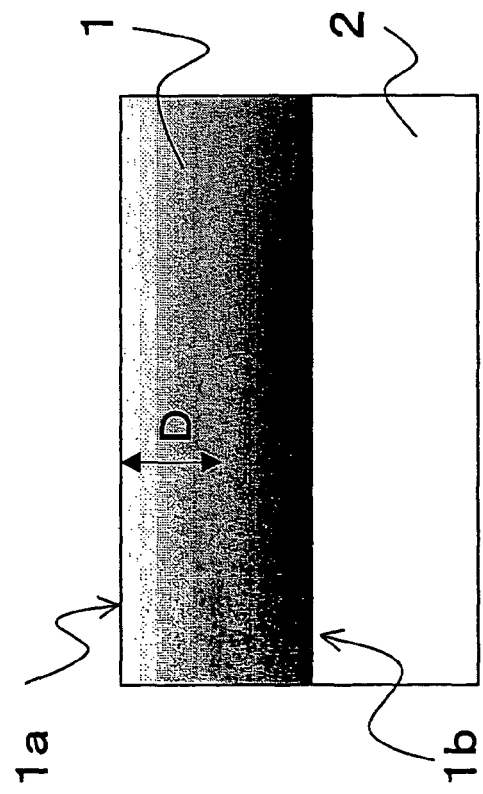
FIG. 1 is a schematic vertical cross-sectional view illustrating a negative electrode for the lithium ion secondary battery of the present invention.

A negative electrode for a lithium ion secondary battery of the present invention includes a current collector and an active material layer carried on the current collector. In the negative electrode, the active material layer comprises a deposit including silicon and an element M incapable of forming an alloy with lithium;

a proportion of the element M in the active material layer is larger in a first side contacting the current collector than in a second side opposite to the first side in the thickness direction of the active material layer (in other words, the proportion of the element M increases from the second side toward the first side); and the element M is different from an element forming the current collector.

The inventors of the present invention found the following and completed the present invention. By giving a gradient to increase the proportion of the element M incapable of forming an alloy with lithium toward the current collector in the negative electrode, as noted in the above, excellent charge and discharge performance at high load can be obtained, the expansion rate at the proximity of the current collector can be made small, and excellent cycle performance can be obtained based on the reduction of the stress.

In the negative electrode of the present invention, the active material layer comprising silicon and the element M incapable of forming an alloy with lithium is excellent in conductivity compared with a layer composed of silicon, and the larger the proportion of the element M, the more the conductivity. Therefore, the conductivity increases from the negative electrode surface toward the current collector side, and the reaction resistance of the electrode decreases as the charge and discharge current increase in the same direction, i.e., from the negative electrode surface to the current collector side. Thus, high battery capacity can be obtained at the time of even when charge and discharge at high load.

Further, in the active material layer comprising silicon and the element M, when the proportion of the element M is higher, the amount of charge and discharge reaction decreases. The higher the proportion of the element M, the smaller the volume expansion rate of the active material layer at the time of reaction with lithium. The volume expansion decreases from the active material layer (for example, a thin film form) surface toward the current collector. Therefore, the expansion rate of the active material layer becomes the lowest at the proximity of the interface between the current collector and the active material layer, thereby easing the stress to reduce the separation of the active material layer at the interface. Therefore, reduction in current collecting performance can be controlled further reliably, and excellent cycle performance can be obtained.

In the second side opposite to the first side contacting the current collector (especially the surface part) of the active material layer, since the stress from the expansion can be eased to the outward direction, the proportion of the element M incapable of forming an alloy with lithium can be made low. Such a negative electrode of the present invention achieves conductivity and expansion stress advantageous to battery performance. That is, the negative electrode of the present invention achieves all of high capacity, performance at high load, and excellent cycle performance.

In the negative electrode of the present invention, the proportion of the element M is preferably increasing from the second side toward the first side in the thickness direction of the active material layer. This is because such continuous increase renders the expansion rate at the time of charging change continuously, which avoids local concentration of the expansion stress.

Herein, "continuous increase in proportion of the element M" refers to a general (substantial) continuous increase of the proportion of the element M from the second side to the first side, and does not necessarily refer to a monotonous increase. For example, there may be a portion where the proportion of the element M is larger in the second side than in the first side in the direction from the second side toward the first side, to the extent not detrimental to the effects of the present invention.

In the present invention, the active material included in the active material layer comprising silicon and the element M is preferably an amorphous alloy comprising silicon and the element M. Further specifically, the active material is preferably an amorphous material represented by the formula:

$$SiM_x (0 \leq X \leq 2).$$

The thin film active material layer comprising silicon and the element M is preferably amorphous or crystallite having a broad peak of a half width of 0.5° or more in 20° to 40° in an X-ray diffraction analysis using Cu—Kα radiation as a light source. Since amorphous or slightly crystalline silicon has high ion conductivity and large charge and discharge capacity at high load, and does not easily crack at the time of expansion, cycle performance is improved further securely.

FIG. 1 is a schematic vertical cross section of an embodiment of the negative electrode for the lithium ion secondary battery of the present invention. The negative electrode shown in FIG. 1 has a current collector 2 and an active material layer 1 in contact with and carried on the current collector 2.

The current collector 2 is composed, for example, of a metal foil. For the metal foil, copper, nickel, or stainless steel may be used, for example. The active material layer 1 includes $SiM_x$ composed, for example, of silicon and the element M incapable of forming an alloy with lithium.

The active material layer 1 is formed so that the proportion of the element M is high in a first side 1b contacting the current collector 2 than in a second side 1a opposite to the first side 1b, in the thickness direction of the active material layer 1 (the direction shown by X in FIG. 1). That is, when the depth of the active material layer 1 from the second side to the first side is represented by D, the active material layer 1 is formed so that the proportion of element M becomes higher as the value of D increases.

The examination of the inventors of the present invention clarified the following relationship between the value x in $SiM_x$ and various characteristics of a battery. That is, when the value x in $SiM_x$ is small, conductivity of the thin film active material layer 1 decreases, battery capacity increases, and the expansion rate of the active material layer 1 at the time of reaction with lithium increases. On the other hand, when the value of x is large, conductivity of thin film active material layer 1 becomes higher, battery capacity decreases, and the expansion rate of the active material layer 1 decreases.

That is, the inventors of the present invention found that the negative electrode of the present invention preferably satisfies the relation formula (1):

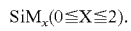

$T/100 \leq T_1 \leq T/3$ where T is the thickness of the active material layer, and $T_1$ is the thickness of the $SiM_x$ portion in the range of $0.3 \leq x$ in the active material layer.

When the thickness of $SiM_x$ portion $T_1$ is T/100 or more, conductivity of the thin film can be appropriately secured, and charge and discharge capacity at high load can be appropriately secured. Additionally, when $T_1$ is T/3 or less, battery capacity can be secured appropriately.

Further, the inventors of the present invention found out that the negative electrode of the present invention satisfies the relation formula (2):

$$T/100 \leq T_2 \leq T/3$$

where T is the thickness of the active material layer, and $T_2$ is the thickness of $SiM_x$ portion in the range of $0 \leq x \leq 0.2$ in the active material layer.

When $T_2$ is T/100 or more, battery capacity can be appropriately secured, and characteristics of silicon can be brought out. Additionally, when $T_2$ is ⅓ of T, due to a small thickness of the layer low in conductivity, charge and discharge capacity at high load can be appropriately secured.

In the active material layer 1, even though the value of x in $SiM_x$ in the proximity of the second side 1a is within the above range, the low conductivity does not give effects particularly, due to the small current density in the proximity of the surface. Rather, advantages from high capacity due to a low proportion of the element M incapable of forming an alloy with lithium probably outweigh disadvantages. Although higher capacity involves a higher volume expansion rate, stress from the volume expansion in the proximity of the surface is easily released to the outside.

Capacity C of the negative electrode of the present invention per 1 cm² area is preferably within the range of 0.1 to 15 mAh. This range is preferable for the same reason noted in the above for the preferable conditions for the proportion between silicon and the element M (the composition and structure of the active material layer) and for the thickness T of the thin film active material layer.

The capacity C is the capacity where the battery is used under a recommended specification noted in a catalog or so of an appliance or the like. For example, when a positive electrode containing lithium cobaltate and the negative electrode of the present invention are used, the battery is charged until reaching the voltage of 4.2 V with a constant current of five-hour rate (a current value that completes the charge in 5 hours), and after a 20-minute interval, discharge is conducted until reaching an end voltage of 2.5 V at the constant current of five-hour rate. The discharge capacity at this time is set as capacity C. The potential of the negative electrode with reference to the potential of lithium is 0.1 V at the time of the charge completion, and is 0.6 V at the time of discharge completion.

The area of the negative electrode refers to the area of the region facing the positive electrode and contributing to charge and discharge reaction.

The thickness T of the active material layer in the present invention is preferably 0.5 to 30 μm. The thickness T of the active material layer is further preferably 20 μm or less. When the thickness is 0.5 μm or more, battery capacity can be secured sufficiently. When the thickness is 30 μm or less, charge and discharge capacity at high load can be appropriately secured without decreasing conductivity in the thickness direction.

A method of producing a negative electrode for a lithium ion secondary battery of the present invention is characterized by including:

depositing at least one of a silicon atom and an atom of an element M, on a current collector with a sputtering method or a vapor deposition method in which a first target of a simple substance of silicon and a second target including the element M incapable of forming an alloy with lithium are used, while moving the current collector continuously, to form an active material layer including silicon and the element M on the current collector, wherein the ratio of the element M relative to lithium in the group of atoms moving toward the current collector from the first target and the second target, is decreased along the direction of the movement of the current collector.

Such a producing method is embodied by the following, for example: along the direction of the movement of the current collector, the first target and the second target are aligned on the upstream side and on the downstream side, respectively; a first deposit amount adjustor for adjusting the amount of the silicon atom to be deposited on the current collector is provided at the first target, and second deposit amount adjustor for adjusting the amount of the atom of the element M to be deposited on the current collector is provided at the second target.

By using the above producing method, the element forming the current collector is not diffused and the current collector does not become thinner and weak, thereby not reducing conductivity of the current collector. Further, the active material layer can be formed by using the element different from the element forming the current collector, and silicon.

Figure 4:
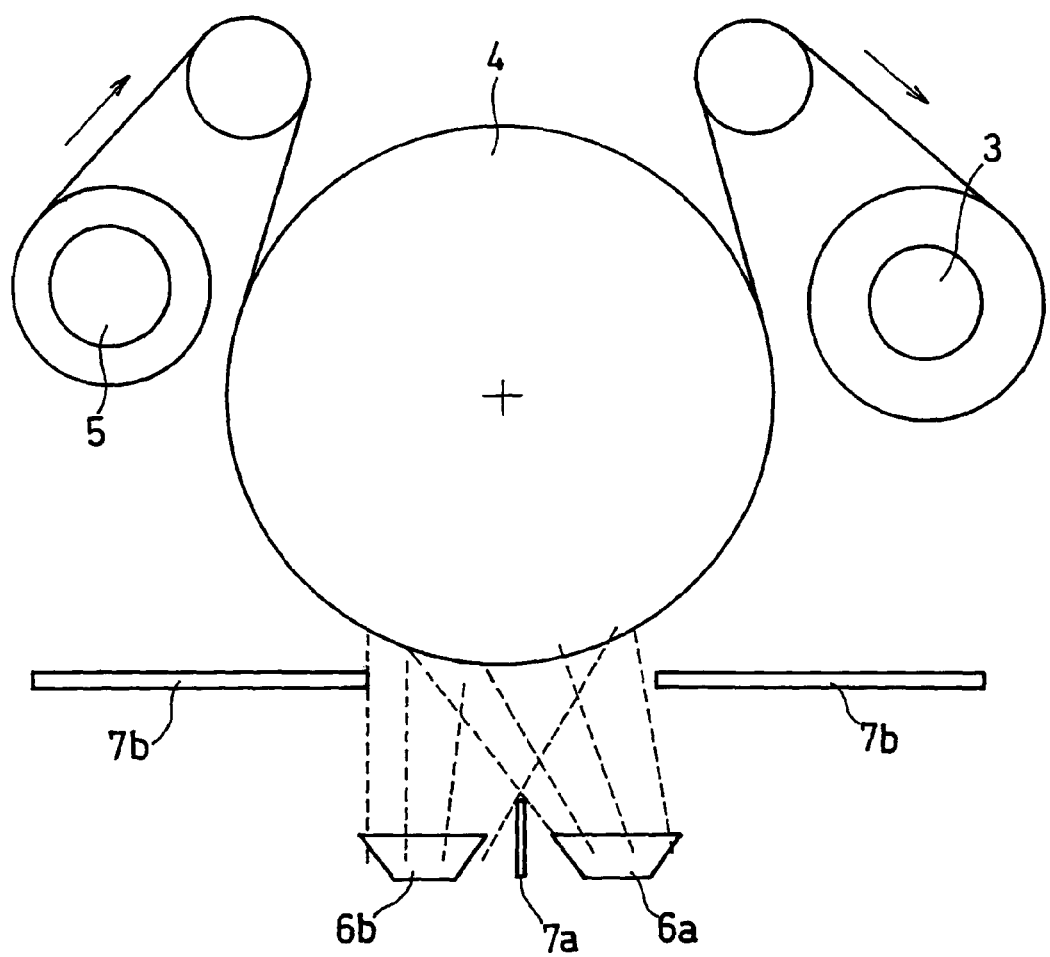
FIG. 4 is a diagram of a vapor deposition apparatus used in Example of the present invention.

FIG. 4 is a diagram of an EB vapor deposition apparatus which enables an embodiment of the method of the present invention. The EB vapor deposition apparatus shown in FIG. 4 has a feed reel 3, a can 4 (a roller for the film-forming portion), and a take-up reel 5 for the current collector (for example, copper foil). The current collector is sent from the feed reel 3 to the take-up reel 5. The EB vapor deposition apparatus has a first target 6a composed of the element M incapable of forming an alloy with lithium, and a second target 6b of the simple substance of silicon.

A first shield plate 7a which is a first deposit amount adjustor is used to change and adjust vapor deposition angle of silicon and the element M incapable of forming an alloy with lithium. A second shield plate 7b which is a second deposit amount adjustor is used to shield vapor scattered to the area outside of necessary field. As noted in the above, important roles of the first shield plate 7a and the second shield plate 7b are to determine the mixture amount of vapor of the element M and silicon.

An EB gun is provided at each of the first target 6a and the second target 6b so that deposit amounts of silicon and the element M incapable of forming an alloy with lithium can be controlled individually.

The energy amount of the EB gun may be considered as one way to adjust the proportion of the element M in the active material layer as a whole. The higher the energy amount of the EB gun, the more the vapor of the element, thereby increasing the amount of the element to be deposited. Therefore, when the energy amount of the EB gun applied to the first target 6a comprising the element M is small relative to the energy amount of the EB gun applied to the second target 6b comprising silicon, for example, the proportion of the element M becomes lower.

First, on a copper foil which is sent to an opening of the second shield plate 7b, silicon and the atom of the element M are vapor deposited so that the proportion of the element M becomes higher. Then, as the copper foil moves towards the take-up reel 5, the vapor deposition is carried out so that the proportion of silicon becomes higher. The proportion of the element M in the active material layer as a whole can be determined by the output of the EB power source, and the change in the proportion may be controlled by the first shield plate 7a and the second shield plate 7b. That is, with the movement of the copper foil, which is the current collector, the thin film active material layer having the desirable proportion of the element M can be formed.

The negative electrode having the same structure with the case when the EB vapor deposition apparatus was used can be formed by using a sputtering apparatus as well. FIG. 5 is a diagram of a sputtering apparatus which enables a preferable embodiment of the method of the present invention. The sputtering apparatus shown in FIG. 5 has a feed reel 3, a can 4, and a take-up reel 5 for the current collector. The current collector is sent from the feed reel 3 to the take-up reel 5. The sputtering apparatus has a first target 6a composed of the element M incapable of forming an alloy with lithium, and a second target 6b of the simple substance of silicon.

A first shield plate 7a which is a first deposit amount adjustor is used to change and adjust vapor deposition angle of silicon and the element M incapable of forming an alloy with lithium. A second shield plate 7b which is a second deposit amount adjustor is used to shield vapor scattered to the area outside of necessary field.

Each of the first target 6a and the second target 6b has a high-frequency AC power supply, so that deposit amounts of silicon and the element M incapable of forming an alloy with lithium to be deposited are independently controlled.

First, on a copper foil which is sent to an opening of the second shield plate 7b, silicon and the atom of element M are deposited to form a film, so that the proportion of the element M becomes higher. Then, as the copper foil moves towards the take-up reel 5, a film is formed so that the proportion of silicon becomes higher. The proportion of the element M in the active material layer comprising the film as a whole can be determined by the output of the high-frequency AC power supply 8, and change in the proportion may be controlled by the first shield plate 7a and the second shield plate 7b. That is, with the movement of the copper foil, which is the current collector, thin film active material layer having the desirable proportion of the element M can be formed.

The present invention is described further in detail by using Examples. However, the present invention is not limited to these Examples.

EXPERIMENT 1

EXAMPLE 1

(i) Preparation of Positive Electrode

To 100 parts by weight of lithium cobaltate ($LiCoO_2$) with an average particle size of 5 μm, 3 parts by weight of acetylene black as a conductive agent, and 4 parts by weight of polyvinylidene fluoride (PVdF) dissolved in N-methyl-2-pyrrolidone (NMP) (4 parts by weight of PVdF itself) as a binder were added. These materials were mixed and then kneaded, to obtain a paste positive electrode material mixture. This positive electrode material mixture was applied on both sides of the current collector sheet comprising an aluminum foil, and then dried, to form an active material layer comprising the positive electrode material mixture. The obtained product was rolled to obtain a positive electrode.

(ii) Preparation of Negative Electrode

A negative electrode was made by using an EB vapor deposition apparatus having a structure shown in FIG. 4 (manufactured by ULVAC, Inc.). An electrodeposited copper foil with a width of 10 cm, a thickness of 35 μm, and a length of 50 m (manufactured by Furukara Circuit Foil Co., Ltd.) as a current collector was placed on a feed reel 3. The copper foil was taken up by a take-up reel, i.e., an empty bobbin, so that the foil travels with a speed rate of 10 cm/min, via the outer periphery of a can 4.

For a first target 6a composed of titanium, i.e., the element M, a granular titanium with 99.9% purity (manufactured by Kojundo Chemical Laboratory Co., Ltd.) was used. For a second target 6b composed of the simple substance of silicon, monocrystal silicon with 99.9999% purity (manufactured by Shin-Etsu Chemical Co., Ltd.) was used. The emission of a first electron beam for the first target 6a composed of titanium was set to 300 mA, and the emission of a second electron beam for the second target 6b composed of silicon was set to 400 mA.

The accelerating voltage of the first electron beam and of the second electron beam were both set to −8 kV. A first shield plate 7a was placed at an appropriate position, and while sending the copper foil, silicon and titanium were deposited by a vapor deposition. The thickness of the thin film formed on one side of the copper foil by the vapor deposition was 10.8 μm. Then, the copper foil was reversed, to deposit silicon and titanium in the same manner on the other side of the copper foil by the vapor deposition. A negative electrode was thus made.

Figure 2:
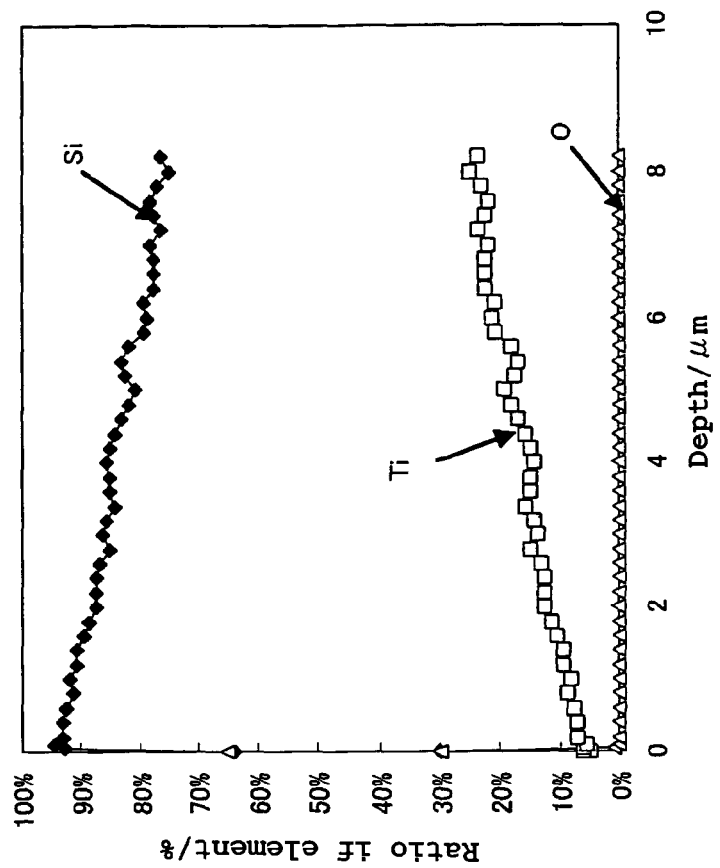
FIG. 2 is a graph showing a result of an AES analysis for an example of the negative electrode of the present invention.

For the negative electrode made in this Example, an AES (Auger Electron Spectroscopy) analysis was conducted. The results are shown in FIG. 2.

Oxygen probably exists on the outermost surface of the thin film active material layer, since an oxide film was formed by a reaction with oxygen in the air. At a depth of 50 nm in the active material layer, oxygen was below the minimum measurement level. It was found that the proportion of titanium (mole ratio x of titanium element in the formula: $SiTi_x$) was the lowest in the proximity of the outermost surface of the active material layer, and was increasing from the outer surface of the active material layer toward the direction of the current collector.

The thickness of $SiTi_x$ ($0 \leq x \leq 0.2$) was 2 μm, and the thickness of $SiTi_x$ ($0.3 \leq x$) was 2 μm (These thicknesses can be measured by Auger Electron Spectroscopy (AES), X-ray Photoelectron Spectroscopy (XPS), or a combination of Transmission Electron Microscope (TEM) and Electron Probe Microanalyzer (EPMA).).

Figure 3:
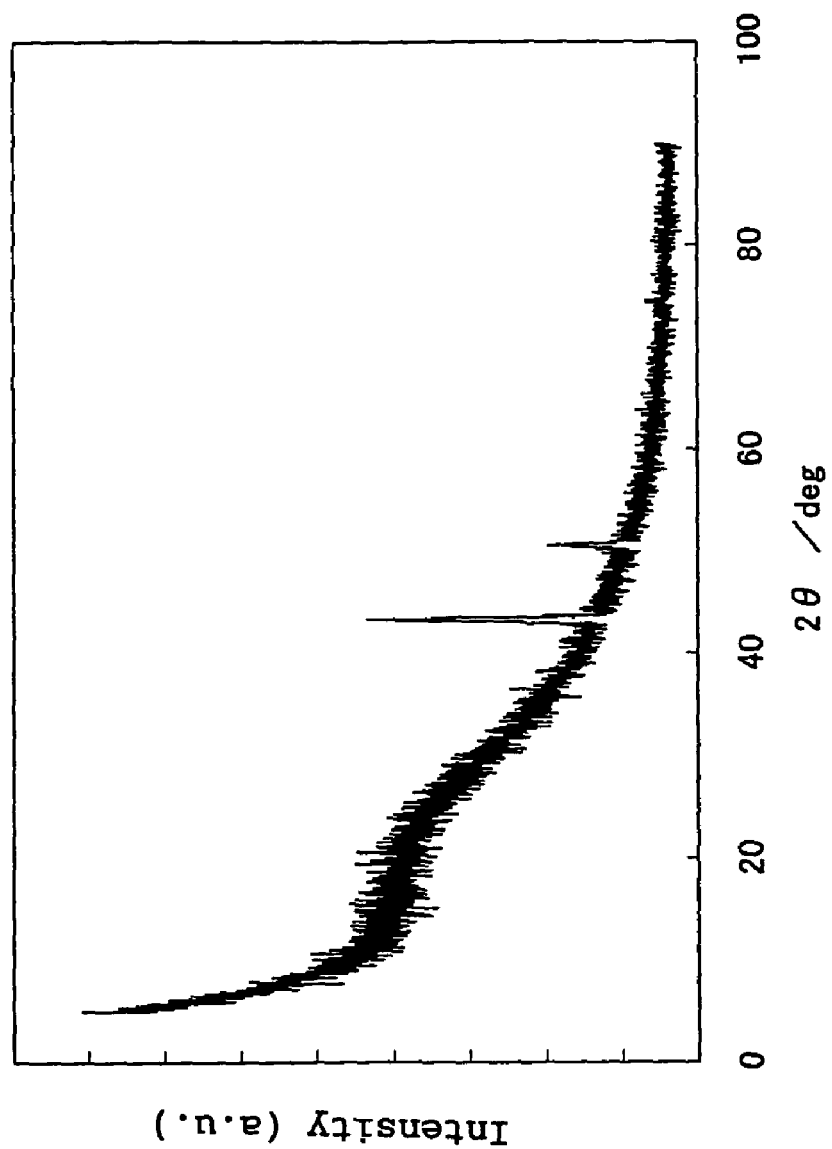
FIG. 3 is a graph showing a result of an XRD analysis for an example of the negative electrode of the present invention.

Further, the negative electrode obtained as noted in the above was analyzed by an XRD (X-ray diffraction) analysis by using Cu-Kα radiation. The results are shown in FIG. 3. As a result of the identification, only copper was detected. Additionally, since a peak could not be found from 10 to 35° (2θ) of the obtained chart, the active material included in the active material layer comprising silicon and the element M incapable of forming an alloy with lithium (titanium) can be considered amorphous.

From the results of the analysis in the above, it was confirmed that: the active material layer in the negative electrode of this Example was the thin film comprising silicon and titanium; a gradient is formed in which the titanium proportion is increased from the outer surface of the active material layer toward the current collector in the thickness direction of the active material layer film; and the active material is amorphous without having specific crystal structure.

(iii) Fabrication of Battery

Figure 6:
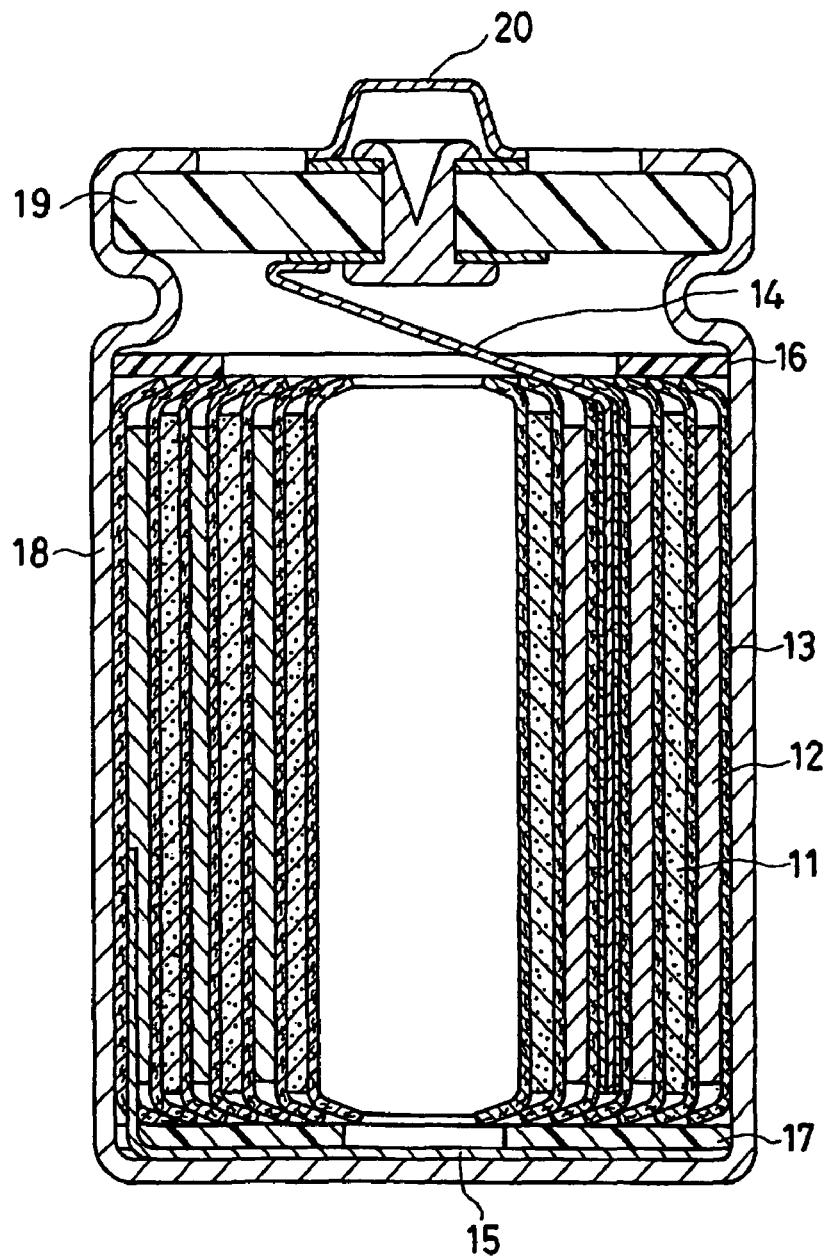
FIG. 6 is a schematic vertical cross sectional view of a cylindrical battery made in Example of the present invention.

The positive electrode and the negative electrode obtained in the above were used to fabricate a cylindrical battery of size 17500. A schematic vertical cross section of a cylindrical battery fabricated is shown in FIG. 6.

First, a positive electrode 11 and a negative electrode 12 were wound up interposing a separator 13 to make an electrode plate assembly. The electrode plate assembly was housed in an iron battery case 18 plated with nickel. To the positive electrode 11, a positive electrode lead 14 made of aluminum was attached, and the lead 14 was connected to a positive electrode terminal 20. The positive electrode terminal 20 was connected to a conductive part attached to the center of a resin sealing plate 19, and the positive electrode lead 14 was connected to the rear side of the conductive part.

To the negative electrode 12, a negative electrode lead 15 made of nickel was attached, and the lead 15 was connected to the bottom of the battery case 18. On the top and the bottom of the electrode plate assembly, an insulating plate 16 and an insulating plate 17 were placed, respectively. Then, an electrolyte obtained by dissolving 1 mol/L of $LiPF_6$ into a solvent mixture of ethylene carbonate (EC) and ethyl methyl carbonate (EMC) (volume ratio 1:3) was injected into the battery case 18, and an opening of the battery case 18 was sealed by using a sealing plate 19.

The cylindrical battery was thus obtained.

[Evaluative Test]

(1) Initial Capacity

The battery thus fabricated was charged with a constant current of 40 mA until reaching a voltage of 4.2 V in an ambient temperature of 25° C. After a 20-minute intermission, the battery was discharged with a current of 40 mA until reaching an end voltage of 2.5 V. This cycle of charge and discharge was repeated twice. The discharge capacity of the second cycle was evaluated as the initial capacity. The results are shown in Table 1.

(2) Discharge Capacity at High Load

The above battery was charged with a charging current of 40 mA until reaching an end voltage of 4.2 V at an ambient temperature of 25° C. After a 20-minute intermission, the battery was discharged with a discharge current of 400 mA until reaching an end voltage of 2.5 V. The capacity obtained was divided by the initial capacity, and the obtained value was evaluated as capacity ratio at a 400 mA discharge (i.e., discharge capacity at high load). The results are shown in Table 1.

(3) Cycle Performance (Capacity Retention Rate)

The battery was charged with a constant current of 40 mA until reaching a voltage of 4.2 V at an ambient temperature of 25° C. After a 20-minute intermission, the battery was discharged with a discharge current of 40 mA until reaching an end voltage of 2.5 V. This cycle of charge and discharge was repeated 100 times. Then, discharge capacity ratio (capacity retention rate), i.e., the capacity after 100 cycles relative to the initial capacity, was calculated and evaluated as cycle performance. The results are shown in Table 1.

COMPARATIVE EXAMPLE 1

A thin film active material layer comprising the simple substance of silicon was formed in the same manner as Example 1, except that the first target 6a composed of titanium was not used. A positive electrode was formed so that the thickness of the active material layer of the positive electrode became 1.2 times the thickness of the active material layer of the positive electrode in Example 1. This positive electrode and the negative electrode were used to fabricate a cylindrical battery in the same manner as Example 1, and the evaluative test was conducted. The results are shown in Table 1.

COMPARATIVE EXAMPLE 2

A thin film of the simple substance of silicon was formed on both sides of a copper foil in the same manner as the negative electrode in Comparative Example 1. Afterwards, by heating the negative electrode at a temperature of 300° C. for an hour under an argon gas atmosphere, copper of the current collector was diffused in the thin film of the simple substance of silicon. The positive electrode was formed so that the thickness of the active material layer thereof has a half the thickness of the active material layer of the positive electrode in Example 1. These positive and negative electrodes were used to fabricate a cylindrical battery in the same manner as Example 1, and the evaluative test was conducted. The results are shown in Table 1.

COMPARATIVE EXAMPLE 3

A thin film of the simple substance of silicon was formed on both sides of a copper foil in the same manner as the negative electrode in Comparative Example 1. Afterwards, by heating the negative electrode for an hour under an argon gas atmosphere at a temperature of 500° C., copper of the current collector was diffused in the thin film of the simple substance of silicon, to a greater degree than in Comparative Example 2. A positive electrode was formed so that the thickness of the active material layer thereof is one-eighth the thickness of the active material layer of the positive electrode in Example 1. These positive and negative electrodes were used to fabricate a cylindrical battery in the same manner as Example 1, and the evaluative test was conducted. The results are shown in Table 1.

COMPARATIVE EXAMPLE 4

In this Comparative Example, a mixture of granular Si and $TiSi_2$ manufactured by Kojundo Chemical Laboratories Co., Ltd. was used as a first target 6a, and a second target 6b was not used. The accelerating voltage of the electron beam was set to −8 kV, and the emission was set to 300 mA to form a thin film of a silicon-titanium alloy on one side of a copper foil. The copper foil was reversed, and deposition was carried out in the same manner on the other side of the copper foil for the vapor deposition. A positive electrode was formed so that the thickness of the active material layer thereof is half the thickness of the active material layer of the positive electrode in Example 1. These positive and negative electrodes were used to fabricate a cylindrical battery in the same manner as Example 1, and the evaluative test was conducted. The results are shown in Table 1.

As a result of an AES analysis for the negative electrode of this Comparative Example, it was confirmed that the value of x in $SiTi_x$ was 0.27, and that the composition is invariable in the thickness direction thereof.

COMPARATIVE EXAMPLE 5

In this Comparative Example, silicon target was used for a first target 6a, and titanium target was used for a second target 6b. The emission of the electron beam applied to silicon target was set to 400 mA and the electron beam applied to titanium target was set to 300 mA. A negative electrode and a positive electrode were made in the same manner as Example 1 except for the above. By using these positive and negative electrodes, a cylindrical battery was fabricated in the same manner as Example 1, and the evaluative test was conducted. The results are shown in Table 1.

As a result of an AES analysis for the negative electrode of this Comparative Example, it was confirmed that the proportion of titanium is decreased from the surface of the active material layer toward the current collector.

TABLE 1

|  | Initial Capacity (mAh) | Capacity Ratio at High Load (%) | Capacity Retention Rate (%) |
| --- | --- | --- | --- |
| Example 1 | 240 | 90 | 92 |
| Comp. Ex. 1 | 274 | 60 | 45 |
| Comp. Ex. 2 | 180 | 70 | 50 |
| Comp. Ex. 3 | 50 | 70 | 60 |
| Comp. Ex. 4 | 100 | 90 | 91 |
| Comp. Ex. 5 | 220 | 62 | 55 |

The results shown in Table 1 revealed that the battery in Example 1 was high in any of initial capacity, capacity ratio at high load, and capacity retention rate. Although initial capacity is high in Comparative Example 1, capacity ratio at high load is low and cycle performance is poor. The battery in Comparative Example 2 in which the negative electrode was heated with a temperature of 300° C. shows a slight improvement in cycle performance and capacity ratio at high load compared with Comparative Example 1, but when compared with the battery in Example 1, the battery in Comparative Example 2 was inferior in every aspect.

In the battery of Comparative Example 3 in which the negative electrode was heated with a temperature of 500° C., although cycle performance is improved compared with Comparative Example 1, initial capacity was the lowest among the batteries of Comparative Examples 1 to 3. This is due to the large amount of copper diffusion, which decreased silicon utilization.

The results in the above revealed that when the same material with the material forming the current collector was diffused in the active material layer comprising the silicon thin film, although performance is improved slightly, the improvement is insufficient. Especially in the battery of Comparative Example 3, the copper layer as the current collector was too thin, which caused partial cracks often in the electrode when winding the electrode. This is probably because the copper foil became too thin and weakened.

In Comparative Example 4, although cycle performance and capacity ratio at high load are the same level with Example 1, initial capacity was quite low. When the composition of the element in the thin film is invariable in the thickness direction as in this case, the higher the proportion of titanium, the lower the capacity, and capacity ratio at high load and cycle performance become excellent. Capacity, and capacity ratio at high load and cycle performance trades off with each other, and cannot achieve both simultaneously.

In Comparative Example 5, although capacity is the same level with Example 1, capacity ratio at high load is low, and cycle performance is inferior compared with Example 1. The inferior capacity ratio at high load in Comparative Example 5 is probably because the proportion of titanium decreases as the position becomes closer to the current collector, thereby increasing resistance. The inferior cycle performance in Comparative Example 5 is probably due to the high expansion rate in the active material layer in the proximity of the current collector, which caused cracks and separations.

EXPERIMENT 2

In an EB vapor deposition apparatus, an EB power output for a first target 6a composed of titanium and a second target 6b composed of silicon, and positions for a first shield plate 6a and a second shield plate 6b were changed to examine the effective range of the titanium proportion.

EXAMPLE 2

Thin film active material layers were formed on both sides of a copper foil to obtain a negative electrode in the same manner as Example 1, except that the emission of the electron beam to be applied to the first target 6a composed of titanium was set to 250 mA. A positive electrode was also made in the same manner as Example 1. By using these positive and negative electrodes, a cylindrical battery was fabricated in the same manner as Example 1, and the evaluative test was conducted. The results are shown in Table 2.

The thickness of the active material layer in the negative electrode was 10 μm. An AES analysis was conducted for the obtained negative electrode, to calculate the value of x in ($SiTi_x$) from the peak intensity ratio of silicon and titanium, and the thickness of $SiTi_x$ ($0 \leq x \leq 0.2$) and the thickness of $SiTi_x$ ($0.3 \leq x$) were obtained. The results are shown in Table 3.

EXAMPLE 3

Thin film active material layers were formed on both sides of a copper foil in the same manner as Example 1 to obtain a negative electrode, except that the emission of the electron beam to be applied to the first target 6a composed of titanium was set to 350 mA. A positive electrode was also made in the same manner as Example 1. By using these positive and negative electrodes, a cylindrical battery was fabricated in the same manner as Example 1, and the evaluative test was conducted. The results are shown in Table 2.

The thickness of the active material layer in the negative electrode was 10 μm. An AES analysis was conducted for the obtained negative electrode, to calculate the value of x in ($SiTi_x$) from the peak intensity ratio of silicon and titanium, and the thickness of $SiTi_x$ ($0 \leq x \leq 0.2$) and the thickness of $SiTi_x$ ($0.3 \leq x$) were obtained. The results are shown in Table 3.

EXAMPLE 4

Thin film active material layers were formed on both sides of a copper foil in the same manner as Example 1 to obtain a negative electrode, except that an opening length of the second shield plate 7b was made 40% smaller, and the traveling speed of the copper foil was set to 6 cm/min. A positive electrode was also made in the same manner as Example 1. By using these positive and negative electrodes, a cylindrical battery was fabricated in the same manner as Example 1, and the evaluative test was conducted. The results are shown in Table 2.

The thickness of the active material layer in the negative electrode was 10 μm. An AES analysis was conducted for the obtained negative electrode, to calculate the value of x in ($SiTi_x$) from the peak intensity ratio of silicon and titanium, and the thickness of $SiTi_x$ ($0 \leq x \leq 0.2$) and the thickness of $SiTi_x$ ($0.3 \leq x$) were obtained. The results are shown in Table 3.

EXAMPLE 5

Thin film active material layers were formed on both sides of a copper foil in the same manner as Example 1 to obtain a negative electrode, except that the emission of the electron beam to be applied to the first target 6a composed of titanium was set to 200 mA. A positive electrode was also made in the same manner as Example 1. By using these positive and negative electrodes, a cylindrical battery was fabricated in the same manner as Example 1, and the evaluative test was conducted. The results are shown in Table 2.

The thickness of the active material layer in the negative electrode was 10 μm. An AES analysis was conducted for the obtained negative electrode, to calculate the value of x in ($SiTi_x$) from the peak intensity ratio of silicon and titanium, and the thickness of $SiTi_x$ ($0 \leq x \leq 0.2$) and the thickness of $SiTi_x$ ($0.3 \leq x$) were obtained. The results are shown in Table 3.

EXAMPLE 6

Thin film active material layers were formed on both sides of a copper foil in the same manner as Example 1 to obtain a negative electrode, except that the emission of the electron beam to be applied to the first target 6a composed of titanium was set to 400 mA. A positive electrode was formed so that the thickness of the active material layer thereof is half the thickness of the active material layer of the positive electrode in Example 1. By using these positive and negative electrodes, a cylindrical battery was fabricated in the same manner as Example 1, and the evaluative test was conducted. The results are shown in Table 2.

The thickness of the active material layer in the negative electrode was 10 μm. An AES analysis was conducted for the obtained negative electrode, to calculate the value of x in ($SiTi_x$) from the peak intensity ratio of silicon and titanium, and the thickness of $SiTi_x$ ($0 \leq x \leq 0.2$) and the thickness of $SiTi_x$ ($0.3 \leq x$) were obtained. The results are shown in Table 3.

TABLE 2

| | Initial Capacity (mAh) | Capacity Ratio at High Load (%) | Capacity Retention Rate (%) |
|---|---|---|---|
| Example 2 | 250 | 80 | 80 |
| Example 3 | 200 | 95 | 96 |
| Example 4 | 220 | 90 | 90 |
| Example 5 | 260 | 70 | 70 |
| Example 6 | 140 | 95 | 97 |

TABLE 3

| | Thickness of $SiTi_x$ (μm) | | Value of x | |
|---|---|---|---|---|
| | $0 \leq x \leq 0.2$ | $0.3 \leq x$ | At the Depth of 50 nm | At the Depth of 8 μm |
| Example 2 | 3 | 0.1 | 0.15 | 0.26 |
| Example 3 | 0.1 | 3 | 0.19 | 0.32 |
| Example 4 | 0.2 | 0.2 | 0.19 | 0.28 |
| Example 5 | 8 | 0 | 0.01 | 0.2 |
| Example 6 | 0 | 9 | 0.25 | 0.33 |

The results in the above revealed that when titanium proportion is relatively high, as in Examples 6, 3, and 4, although capacity ratio at high load improved and cycle performance became excellent, initial capacity tended to decrease. The results in Examples 2 to 4 showed that the conditions for excellent balance between capacity, and discharge capacity at high load and cycle performance were: the thickness of $SiTi_x$ ($0 \leq x \leq 0.2$) at the proximity of the surface is 0.1 to 3 μm, and the thickness of $SiTi_x$ ($x \geq 0.3$) at the proximity of the interface with the copper foil is 0.1 to 3 μm.

Since the battery in Example 5 has a lower proportion of titanium in the film as a whole, it has higher initial capacity but is slightly inferior in cycle performance. Although the battery in Example 6 is excellent in cycle performance due to a higher titanium proportion in the whole film, initial capacity is slightly low.

EXPERIMENT 3

In an EB vapor deposition apparatus, the traveling speed of a copper foil as a current collector was changed to examine the effective thickness of the active material layer.

EXAMPLE 7

Thin film active material layers (thickness 0.5 μm) were formed on both sides of a copper foil in the same manner as Example 1 to obtain a negative electrode, except that the traveling speed of the copper foil was set to 2 m/min. A positive electrode was formed so that the thickness of the active material layer thereof is eighth the thickness of the active material layer of the positive electrode in Example 1. By using these positive and negative electrodes, a cylindrical battery was fabricated in the same manner as Example 1, and the evaluative test was conducted. The results are shown in Table 4.

EXAMPLE 8

Thin film active material layers (thickness 20 μm) were formed on both sides of a copper foil in the same manner as Example 1 to obtain a negative electrode, except that the traveling speed of the copper foil was set to 5 cm/min. A positive electrode was formed so that the thickness of the active material layer thereof is 1.5 times the thickness of the active material layer of the positive electrode in Example 1. By using these positive and negative electrodes, a cylindrical battery was fabricated in the same manner as Example 1, and the evaluative test was conducted. The results are shown in Table 4.

EXAMPLE 9

Thin film active material layers (thickness 30 μm) were formed on both sides of a copper foil in the same manner as Example 1 to obtain a negative electrode, except that the traveling speed of the copper foil was set to 3.3 cm/min. A positive electrode was formed so that the thickness of the active material layer thereof is twice the thickness of the active material layer of the positive electrode in Example 1. By using these positive and negative electrodes, a cylindrical battery was fabricated in the same manner as Example 1, and the evaluative test was conducted. The results are shown in Table 4.

EXAMPLE 10

Thin film active material layers (thickness 38 μm) were formed on both sides of a copper foil in the same manner as Example 1 to obtain a negative electrode, except that the traveling speed of the copper foil was set to 2.7 cm/min. A positive electrode was formed so that the thickness of the active material layer thereof is 2.5 times the thickness of the active material layer of the positive electrode in Example 1. By using these positive and negative electrodes, a cylindrical battery was fabricated in the same manner as Example 1, and the evaluative test was conducted. The results are shown in Table 4.

TABLE 4

|  | Initial Capacity (mAh) | Capacity Ratio at High Load (%) | Capacity Retention Rate (%) |
| --- | --- | --- | --- |
| Example 7 | 98 | 98 | 98 |
| Example 8 | 320 | 82 | 91 |
| Example 9 | 455 | 75 | 75 |
| Example 10 | 460 | 75 | 65 |

The results in Table 4 revealed that in view of capacity ratio at high load and cycle performance, the thickness of the film is preferably 30 μm, and that especially 20 μm or less is preferable. When the traveling speed of the copper foil was set to 2 m/min, the film thickness can be made thinner than 0.5 μm. However, since the thickness of the positive electrode on the opposite side becomes small relative to capacity of the negative electrode, it becomes difficult to form a positive electrode by the method in the above. In this experiment, the thickness of the copper foil was made constant, and since the copper foil was excessively thick relative to the thickness of the film of 0.5 μm, the area of the electrode to be inserted in the battery case decreased, thereby showing a low capacity value.

EXPERIMENT 4

EXAMPLE 11

A negative electrode was made by using a sputtering apparatus having a structure shown in FIG. 5 (manufactured by ULVAC, Inc.). An electrodeposited copper foil, i.e., a current collector with a width of 10 cm, a thickness of 35 μm, and a length of 50 m (manufactured by Furukara Circuit Foil Co., Ltd.) was placed on a feed reel 3. This copper foil was taken up by a take-up reel (an empty bobbin), so that the foil travels with a speed of 5 mn/min, via the outer periphery of a can 4.

For the sputtering gas, argon manufactured by Nippon Sanso Corporation (99.999% purity) was used. The flow rate of argon was set to 100 sccm. For a first target 6a composed of titanium, titanium (99.9% purity) manufactured by Furuuchi Chemical Corporation was used. For a second target 6b composed of silicon, silicon monocrystal (99.9999% purity) manufactured by Furuuchi Chemical Corporation was used. The pressure in the chamber was 1 Torr.

The output of the high-frequency AC power supply applied to the second target 6b composed of silicon was set to 2 kW, and the output of the high-frequency AC power supply for the first target 6a composed of titanium was set to 1.5 kW.

A thin film active material layer was formed on one side of the copper foil, while sending the copper foil. The thickness of the thin film was 10 μm. As an AES analysis was carried out for this thin film to obtain the depth and the proportion of silicon and titanium, it was revealed that the proportion of titanium distribution was almost the same as that of the thin film of Example 1. The copper foil was reversed, and an active material layer was formed on the other side of the copper foil in the same manner.

A positive electrode was made in the same manner as Example 1. A cylindrical battery was fabricated in the same manner as Example 1 by using the positive and negative electrodes thus obtained, and the evaluative test was conducted. The results are shown in Table 5.

EXAMPLE 12

A negative electrode was made in the same manner as Example 10, except that an electrodeposited copper foil having a width of 10 cm, a thickness of 35 μm, a length of 50 m, and a surface roughness Ra of 1 μm (manufactured by Furukara Circuit Foil Co., Ltd.) was used for the copper foil. A positive electrode was made in the same manner as Example 1. A cylindrical battery was fabricated in the same manner as Example 1 by using the obtained positive and negative electrodes, and the evaluative test was conducted. The results are shown in Table 5.

TABLE 5

|  | Initial Capacity (mAh) | Capacity Ratio at High Load (%) | Capacity Retention Rate (%) |
| --- | --- | --- | --- |
| Example 11 | 245 | 89 | 85 |
| Example 12 | 240 | 90 | 95 |

By comparing Example 11 and Example 1 in Table 1, it was confirmed that the same level of performance can be obtained in any of the film-forming method using the EB vapor deposition apparatus and the method using the sputtering apparatus. Additionally, in the battery of Example 12 in which the copper foil surface was roughened, cycle performance was excellent compared with Example 11. Although cycle performance was fine in the battery of Example 1 in which the copper foil with a lower degree of roughness was used, the copper foil with a higher degree of roughness further improves the performance.

EXPERIMENT 5

Next, an element M incapable of forming an alloy with lithium other than titanium was examined.

EXAMPLE 13

A negative electrode was made in the same manner as Example 1, except that a granular nickel manufactured by Kojundo Chemical Laboratories Co., Ltd. was used for the first target 6a. A positive electrode was made in the same manner as Example 1. The obtained positive and negative electrodes were used to fabricate a cylindrical battery in the same manner as Example 1, and the evaluative test was conducted. The results are shown in Table 6.

EXAMPLE 14

A negative electrode was made in the same manner as Example 1, except that a stainless steel foil having a thickness of 20 μm (manufactured by Nippon Steel Corporation) was used for the current collector, a granular copper manufactured by Kojundo Chemical Laboratories Co., Ltd. was used for the first target 6a, and the emission of the electron beam applied to the first target was set to 250 mA. A positive electrode was made in the same manner as Example 1. The obtained positive and negative electrodes were used to fabricate a cylindrical battery in the same manner as Example 1, and the evaluative test was conducted. The results are shown in Table 6.

EXAMPLE 15

A negative electrode was made in the same manner as Example 1, except that a granular cobalt manufactured by Kojundo Chemical Laboratories Co., Ltd. was used for the first target 6a. A positive electrode was made in the same manner as Example 1. The obtained positive and negative electrodes were used to fabricate a cylindrical battery in the same manner as Example 1, and the evaluative test was conducted. The results are shown in Table 6.

EXAMPLE 16

A negative electrode was made in the same manner as Example 1, except that a granular iron manufactured by Kojundo Chemical Laboratories Co., Ltd. was used for the first target 6a. A positive electrode was made in the same manner as Example 1. The obtained positive and negative electrodes were used to fabricate a cylindrical battery in the same manner as Example 1, and the evaluative test was conducted. The results are shown in Table 6.

TABLE 6

|  | Initial Capacity (mAh) | Capacity Ratio at High Load (%) | Capacity Retention Rate (%) |
| --- | --- | --- | --- |
| Example 13 | 220 | 80 | 80 |
| Example 14 | 210 | 85 | 85 |
| Example 15 | 205 | 80 | 80 |
| Example 16 | 207 | 82 | 83 |

Batteries in Examples 13 to 16 show excellent performance, i.e., initial capacity of 200 mA or more, and cycle capacity retention rate of 80% or more. The above results revealed that the effects of the present invention can be obtained as well when any of nickel, copper, cobalt, and iron was selected for the element incapable of forming an alloy with lithium.

A negative electrode for the lithium ion secondary battery of the present invention is useful for a negative electrode for a lithium ion secondary battery with high capacity, and excellent cycle performance and charge and discharge performance at high load.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A negative electrode for a lithium ion secondary battery, including a current collector and an active material layer carried on said current collector:

wherein said active material layer comprises a deposit including silicon and an element M incapable of forming an alloy with lithium;

a proportion of said element M in the thickness direction of said active material layer is larger in a first side contacting said current collector than in a second side opposite to said first side;

said element M is titanium, said active material layer comprises an amorphous alloy including silicon and said element M, and the negative electrode satisfies the relation formula (1):

$$T/100 \leq T_1 T/3$$

where T is a thickness of said active material layer, $T_1$ is a thickness of the $SiM_x$ portion in the range of $0.3 \leq x$ in said active material layer, and in the remainder of said active material layer not in the region where the $SiM_x$ portion is in the range of $0.3 \leq x$, the amorphous alloy $SiM_x$ meets the limitation of $0 < x \leq 0.2$.

2. The negative electrode for a lithium ion secondary battery in accordance with claim 1, wherein the proportion of said element M in the thickness direction of said active material layer continuously increases from said second side toward said first side.

3. The negative electrode for a lithium ion secondary battery in accordance with claim 1, wherein said active material layer comprises an amorphous material represented by the formula:

$$SiM_x$$

where $0 \leq X \leq 2$.

4. The negative electrode for a lithium ion secondary battery in accordance with claim 1, wherein a capacity C of said active material layer is 0.1 to 15 mAh/cm².

5. The negative electrode for a lithium ion secondary battery in accordance with claim 1, wherein a thickness T of said active material layer is 0.5 to 30 μm.

* * * * *

UNITED STATES PATENT AND TRADEMARK OFFICE
CERTIFICATE OF CORRECTION

PATENT NO. : 7,862,930 B2
APPLICATION NO. : 11/377276
DATED : January 4, 2011
INVENTOR(S) : Yasutaka Kogetsu et al.

It is certified that error appears in the above-identified patent and that said Letters Patent is hereby corrected as shown below:

IN THE CLAIMS:

In Column 19, Line 10 (Claim 1), in formula (1) please change "$T/100 \leqq T_1 T/3$" to -- $T/100 \leqq T_1 \leqq T/3$ --.

Signed and Sealed this
Twenty-sixth Day of April, 2011

David J. Kappos
*Director of the United States Patent and Trademark Office*